(12) United States Patent
Maunder

(10) Patent No.: US 9,044,845 B2
(45) Date of Patent: Jun. 2, 2015

(54) TUBE APPLICATOR

(71) Applicant: Roy Peter Maunder, Lovedean (GB)

(72) Inventor: Roy Peter Maunder, Lovedean (GB)

( * ) Notice: Subject to any disclaimer, the term of this patent is extended or adjusted under 35 U.S.C. 154(b) by 174 days.

(21) Appl. No.: 13/648,308

(22) Filed: Oct. 10, 2012

(65) Prior Publication Data

US 2013/0086791 A1    Apr. 11, 2013

(30) Foreign Application Priority Data

Oct. 10, 2011    (GB) .................................. 1117447.1

(51) Int. Cl.
*B23P 11/02* (2006.01)
*B23P 19/02* (2006.01)
*B23P 19/04* (2006.01)
*B25B 27/10* (2006.01)

(52) U.S. Cl.
CPC ........... *B25B 27/10* (2013.01); *Y10T 29/53987* (2015.01); *Y10T 29/49945* (2015.01); *B23P 11/02* (2013.01); *B23P 19/02* (2013.01); *B23P 19/04* (2013.01)

(58) Field of Classification Search
CPC .......... B23P 11/02; B23P 17/00; B23P 17/02; B23P 17/04; B23P 19/00; B23P 19/02; B23P 19/04; B23P 19/10; B23P 19/12; B25B 27/10
USPC ............. 29/466, 234, 237, 281.1, 281.4, 282, 29/235
See application file for complete search history.

(56) References Cited

U.S. PATENT DOCUMENTS

| 331,147 | A | * | 11/1885 | Mallinckrodt | 29/237 |
|---|---|---|---|---|---|
| 4,811,441 | A | * | 3/1989 | Potesta | 7/158 |
| 4,945,621 | A | * | 8/1990 | Sugiyama | 29/237 |
| 5,483,731 | A | * | 1/1996 | Prendel et al. | 29/237 |
| 5,704,106 | A | * | 1/1998 | Sampson et al. | 29/450 |
| 5,979,032 | A | * | 11/1999 | Roy et al. | 29/237 |
| 6,658,711 | B1 | * | 12/2003 | Benson | 29/237 |
| 7,114,229 | B1 | * | 10/2006 | Nago | 29/237 |
| 7,163,238 | B1 | * | 1/2007 | Mittersteiner et al. | 285/242 |
| 7,322,085 | B1 | * | 1/2008 | Benson | 29/237 |
| 8,191,226 | B2 | * | 6/2012 | Avnon | 29/525 |
| 2004/0128814 | A1 | * | 7/2004 | Esson et al. | 29/237 |
| 2007/0045353 | A1 | * | 3/2007 | Davis et al. | 222/391 |
| 2007/0209204 | A1 | * | 9/2007 | Chase et al. | 29/890.144 |
| 2011/0179617 | A1 | * | 7/2011 | Maunder | 29/280 |

* cited by examiner

*Primary Examiner* — Alexander P Taousakis
*Assistant Examiner* — Matthew P Travers
(74) *Attorney, Agent, or Firm* — Lambert & Associates; Gary E. Lambert; David J. Connaughton, Jr.

(57) ABSTRACT

Apparatus to insert a spigot into a flexible tube comprises a support for holding and advancing a spigot, actuated by a motor, and a grip for holding a flexible tube, its opening and closing controlled by a motor. On operation of the apparatus, the support is advanced to urge the spigot into the flexible tube. To prevent catching or snagging of the tube on the spigot preventing insertion, after forward motion of the spigot, the jaws are opened, and the spigot is retreated a short distance, the jaws are closed and the spigot is advanced again. This cycle is then repeated until the spigot is fully within the tube. The jaws have a front section and a separate back section, mounted against a resistance, to hold the tube. The front section will be urged back against the resistance on insertion of the spigot, which will not reach the back section.

8 Claims, 4 Drawing Sheets

TUBE APPLICATOR

CROSS REFERENCE TO RELATED APPLICATIONS

This application claims the benefit of and takes priority under 35 U.S.C. §119 to United Kingdom Patent Application Number 1117447.1 filed on Oct. 10, 2011.

FIELD OF THE INVENTION

The present invention relates to apparatus for connecting a flexible tube to a spigot, typically incorporating a barb, or the like.

DESCRIPTION OF RELATED ART

In the food, medical and pharmaceutical industries single use apparatus, or bio-disposable systems, are used in the preparation of batches of some products. Such single use apparatus includes flexible tubing, which is typically made from silicone, but may be made from other plastics materials, such as thermoplastics. Connections to other pieces of apparatus are commonly made with flanged connectors clamped to each other. The connectors have hollow spigots to which a flexible tube is connected in a fluid tight manner. Connections to other pieces of apparatus can also made using hollow spigots. These spigots are generally provided with barbed ends to retain the tubes.

It is important that this connection between the flexible tube and hollow spigot is fluid tight as fluid leaking between this connection would be lost to the process and when using valuable fluids any loss can be significant. It is particularly important that the connection is stable for the lifetime of the apparatus, because if the connection were to fail, the whole batch may be lost. To prevent disconnection and leaks, the connection is tight, with the profile of the barb extending slightly beyond the normal diameter of the tube causing slight stretching of the tube around the barb, and therefore making spontaneous disconnection of the tube from the spigot unlikely to occur. However, this of course makes connecting the tube to the spigot also difficult.

To aid connection a lubricant, such as alcohol, in particular isopropyl alcohol, or oil, can be used. However, this can ease both the connection between the tube and the spigot, and the disconnection. In addition, the lubricant can seep into the apparatus and contaminate the reaction chemicals and solvents, and the products. Thus it is preferable to avoid the use of such lubricants.

Apparatus has been developed to insert a spigot into a flexible tube, however, these typically incorporate the use of fingers inside the flexible tube to pull the tube open so the spigot can be inserted. While this certainly aids insertion of the spigot into the tube, the use of fingers adds potential contamination into the apparatus and risks damage to both the tube and the spigot, as the stretch must accommodate the stretching fingers as well as the spigot initially. In addition, various types of plastic tubing, in particular thermoplastic tubing, does not return fully to shape once stretched. Thus the use of this type of apparatus to pull the tube open can lead to a permanently enlarged tube and thus a poor connection.

In my earlier UK patent application, published under GB2477209, I described apparatus for inserting a spigot into a flexible tube, the apparatus including:

means for supporting and advancing a spigot and
means for gripping a flexible tube, while the spigot is inserted therein,
the gripping means including a pair of jaws for gripping and releasing the tube, with sufficient strength to hold the tube but not crush the same,
at least part of one or both jaws being moveably mounted against a resistance such that under the force of the advancing spigot at least part of one or both jaws can release sufficiently to allow the spigot to pass into the tube, while retaining the tube in the apparatus.

This is extremely successful. However, where the flexible tube is stiffer than usual, for example due to the tube being cold, or made from a different or thicker material to the silicone tubing most commonly used, or the barbed connector has a particularly exaggerated profile, then the device can still have difficulties in inserting a spigot into a tube.

The object of the present invention is to provide improved apparatus for inserting a spigot into a flexible tube.

SUMMARY OF THE INVENTION

According to the invention there is provided apparatus for inserting a spigot into a flexible tube, the apparatus including:— means for supporting and advancing a spigot; and
means for gripping a flexible tube for insertion of the spigot;
the gripping means including a pair of jaws for gripping and releasing the tube, with sufficient strength to hold to the tube but not crush the same,
at least part of one or both jaws being moveably mounted against a resistance such that under the force of the advancing spigot at least part of one or both jaws can release sufficiently to allow the spigot to pass into the tube, while retaining the tube in the apparatus;
a microprocessor to control movement of the advancing means and the gripping means during insertion of the spigot into the flexible tube;
the apparatus programmed to include the steps of advancing a spigot into a tube, opening the jaws to allow the tube to relax, closing the jaws and advancing the spigot further into the tube.

Normally the programme will include the further step of retracting the spigot while the jaws are open. This prevents the tube holding the spigot being positioned further back in the jaws when they are closed.

The cycle of advancing the spigot, opening the jaws, retracting the spigot and closing the jaws can be programmed to be repeated a predetermined number of times. The number of cycles may be chosen by a user prior to operation. Typically the cycle will be repeated twice or three times, however, it can be repeated three, four, five, six or even seven times, or indeed any number of times, until the spigot is fully inserted into the tube. This will depend upon the profile of the spigot and the flexibility of the tube.

Preferably both the jaws and the supporting means for the spigot are easily replaceable, so that jaws and spigot supports can be matched to the tube and spigot to be used, and each other. Preferably the jaws are provided with contouring to hold the tube, and are flared slightly at their distal end to accommodate the spigot. The contouring and flaring can be matched to the dimensions of the tube and spigot. The spigot may be part of a flanged connector, an adapter, a T- or Y-piece or anything else used in single use apparatus, including a filter. The support can be chosen to fully support the apparatus bearing the spigot.

According to a second aspect of the invention there is provided a method of inserting a spigot into a flexible tube, using apparatus including:— means for supporting and advancing a spigot; and means for gripping a flexible tube for insertion of the spigot;

the gripping means including a pair of jaws for gripping and releasing the tube, with sufficient strength to hold to the tube but not crush the same, at least part of one or both jaws being moveably mounted against a resistance such that under the force of the advancing spigot at least part of one or both jaws can release sufficiently to allow the spigot to pass into the tube, while retaining the tube in the apparatus;

the method including the steps of:— advancing the spigot;

halting advance of the spigot;

opening the jaws;

closing the jaws;

repeating this cycle.

Usually the method will include the additional step of retracting the spigot between the steps of opening and closing the jaws.

Typically the spigot will be advanced by a predetermined distance, and then retreated by a predetermined distance. Alternatively, the spigot may be advanced for a predetermined period of time, and then retreated for a predetermined period of time. A combination of time period and distance could also be used to determine the forwards and back movement. In a further alternative the spigot can be advanced until a predetermined resistance it met.

Usually the cycle will be repeated a predetermined number of times. However, the cycle may be repeated until stopped by an operator, or until no further forwards motion of the spigot is detected during a cycle.

According to a third aspect of the invention there is provided apparatus for inserting a spigot into a flexible tube, the apparatus including:— means for supporting and advancing a spigot; and means for gripping a flexible tube for insertion of the spigot;

the gripping means including a pair of jaws for gripping and releasing the tube, with sufficient strength to hold to the tube but not crush the same, at least part of one or both jaws being moveably mounted against a resistance such that under the force of the advancing spigot at least part of one or both jaws can release sufficiently to allow the spigot to pass into the tube, while retaining the tube in the apparatus wherein at least one of the jaws includes at least two sections, each moveably mounted against a resistance, a front section, for holding the part of the tube into which the spigot is inserted, being flared towards its front end to allow for insertion of the spigot, and a back section contoured in accordance with the dimensions of the tube only, to maintain a grip on the tube while the spigot is being inserted into the tube.

Usually both of the jaws will be provided in two sections.

Preferably the jaws are provided with fine grooves or ridges to aid grip on the flexible tube. Alternatively the jaws may be sandblasted or otherwise roughened to increase friction.

Typically both sections of the jaws are made of metal, however, the jaws may be made of a plastics material.

Advantageous, the resistance against movement of the back jaw may be stronger than the resistance of the front section.

BRIEF DESCRIPTION OF THE DRAWINGS

To help understanding of the invention, a specific embodiment thereof will now be described by way of example and with reference to the accompanying drawings, in which.

DETAILED DESCRIPTION

Figure 1:
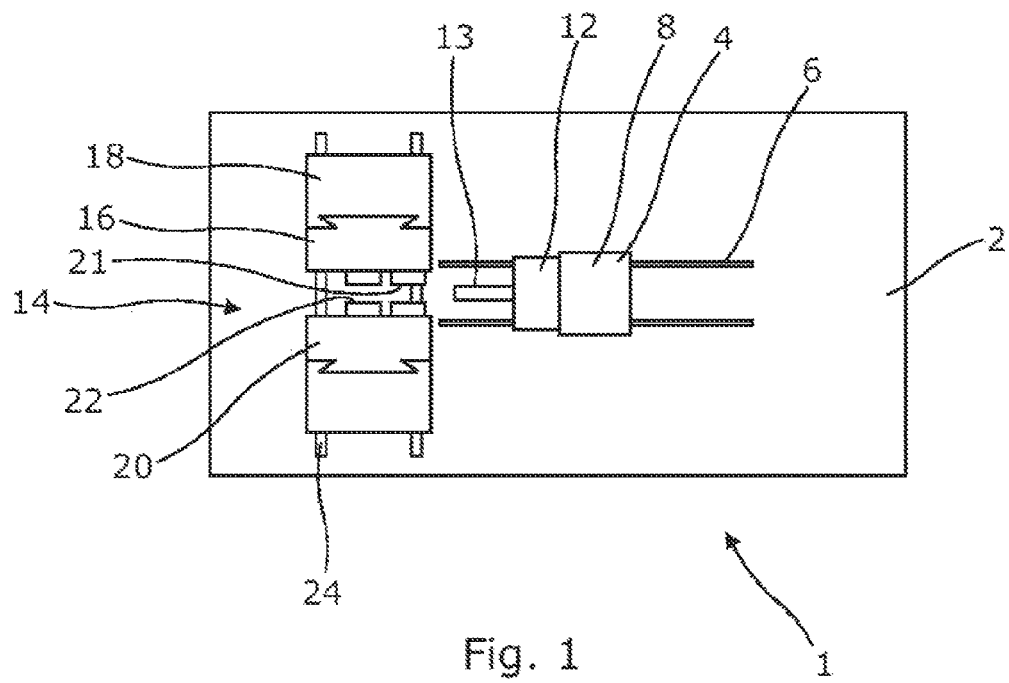
FIG. 1 is a top view of the apparatus according to the invention.

Referring to the Figures, the apparatus thereshown 1, comprises a base 2 on which is mounted a support 4 for a connector having a spigot S (the connector and spigot are not shown in FIG. 1). The spigot has a barbed end B. While barbed end spigots are the most commonly used, the device could also be used on spigots with parallel ends or ends of other shapes, such as domed or olive. The connector may be a flanged connector, but may also be a T-connector, a Y-connector, adapters, or any other type of device to which a flexible tube is connected, including filters and the like.

The support 4 is mounted on a pair of runners 6 to allow it to be advanced forward and retreated backwards along the base 2. Alternatively any other system for allowing and controlling the movement of the support can be used. For example sliders provided in grooves in the base, or wheels in tracks. The support includes a motor associated with a holder 8, to move the support backward and forwards as required, and an attachment 12, removably connected to the holder, designed to support the connector to be used. Usually the motor will be a pneumatic motor, operating a piston to move the support, however, other types of motor, such as linear, rotary, servo or hydraulic may also be used. The attachment usually includes a rod 13 of the correct dimensions to support the spigot, and may include a back support for holding the body of the connector and/or a support base (not present in the embodiment shown) to support the connector. The attachment 12 is designed for the specific connector and can be readily replaced for other attachments dependent upon the connector used. The movement of the support along the runners can be set to adjust the stroke of the forward motion of the support 4, and its starting position again in accordance with the shape and particularly length of the spigot.

The base also carries a grip 14 for the flexible tube T. The grip includes a pair of jaws 16. As shown these are supported on a pair of carriers 18, associated with a motor, pneumatic piston or other mechanical or powered means for opening and closing the jaws, as discussed in relation to the movement of the spigot. Alternatively, for certain operations, the jaws can be opened and closed manually, for example using a lever to move the carriers, under cam control (not shown). The jaws are readily replaceable on the carriers, so that the jaws can be matched to the flexible tube, and in particular the diameter of the flexible tube, and to the diameter and profile of the barb on the spigot. The jaws and carriers being positioned on the base such that the open end of the tube is in line with and facing a spigot on the support 4, for insertion of the spigot into the tube.

Figure 2:
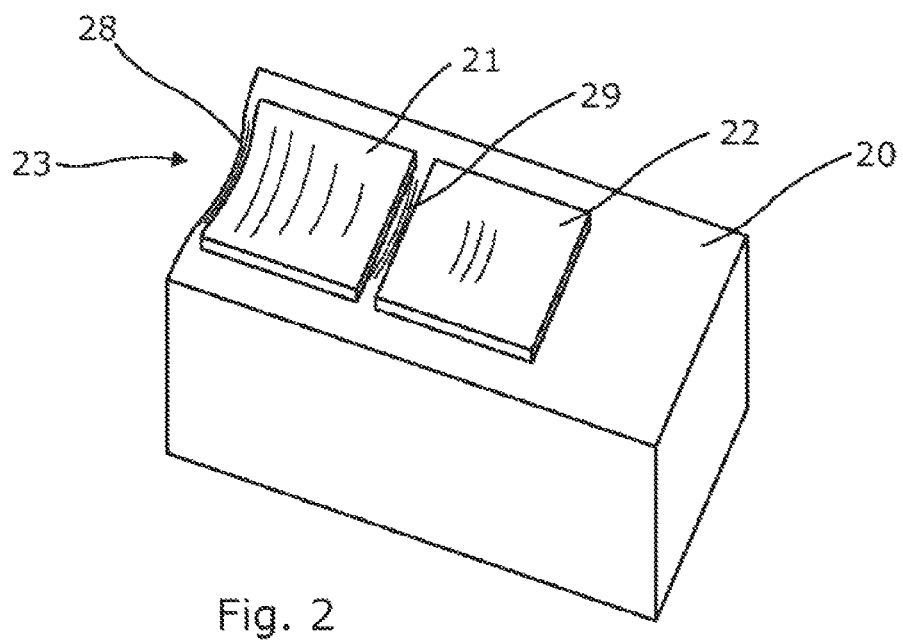
FIG. 2 a perspective view of one of the jaws according to the invention.
Figure 3:
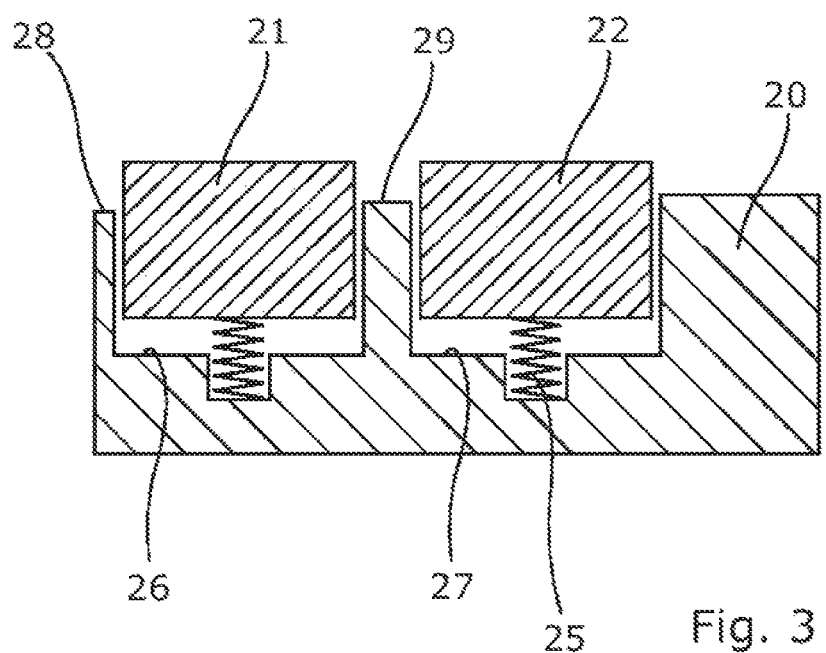
FIG. 3 a cross-sectional view of the jaw of FIG. 2.
Figure 4:
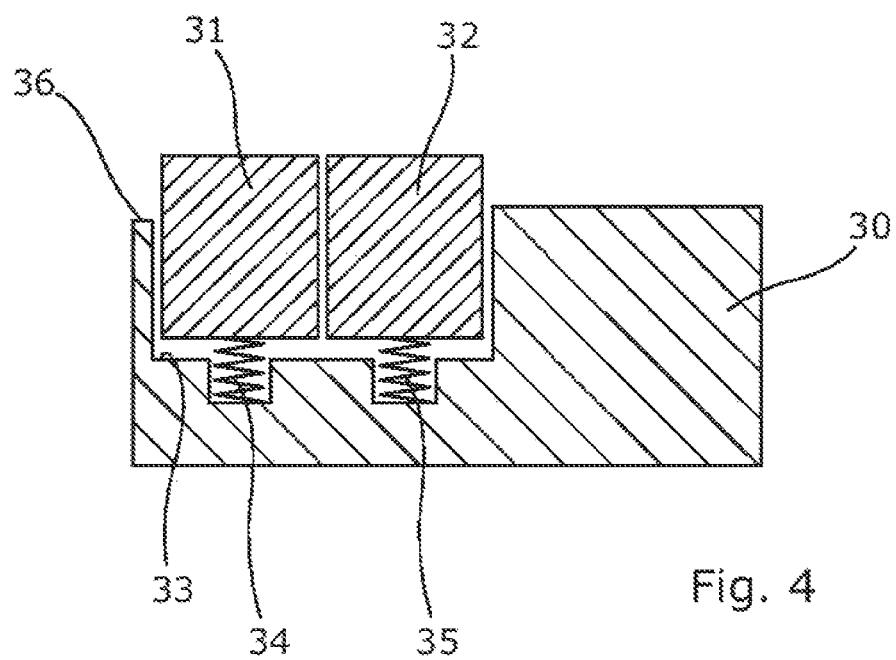
FIG. 4 is a cross-sectional view of an alternative jaw according to the invention.

Referring to FIGS. 2, 3 and 4, the jaws 16 comprise holding blocks 20, which are designed to fit into the carriers. While each jaw can comprise a single compressible member, in the preferred embodiment within the supporting blocks are two compressible members, a front jaw member 21 and a back jaw member 22. These may be compressible as a result of compressible material such a foam provided between the block 20 and the members 21, 22, or because part of the member is made from a compressible material, however usually, as shown, a compression spring 25 is provided between the block and the members 21, 22. The members sit slightly proud of the block to allow for compression where necessary.

Although the back member could be provided as fixed, it has been found that making it compressible allows slightly higher pressure to be applied to the jaw without collapse of the tube, to give an improved grip thereon. The compression spring of the back member may be of a greater stiffness than the compression spring of the front member or may be essentially identical.

The jaw members 21, 22 are provided with contouring to hold the flexible tube. The front member 21 is provided with a contoured elongate groove that is flared 23 at its front end to accommodate the spigot. The degree and length of the flaring can be chosen in accordance with the spigot to be inserted into the tube. A general flare will be satisfactory for most standard barbs used in such single-use apparatus, however for more extreme barbs, specific shaping will be advantageous. The back member 22 is provided with an elongate groove that is not flared, but is sized to hold the tube and will be matched to the tube alone. The size of the jaw members and the spacing between them is chosen such that the spigot, when inserted into the tube, will be accommodated within the front member only, with the back member gripping a section of tubing into which the spigot will not reach. The back member thus maintains a firm hold on the tube without being forced open on insertion of the spigot, holding the tube in position and preventing it from being pushed back on insertion of the spigot. While only one of the pair of jaws could be provided with compressible member(s), providing both of the pair of jaws with such members provides a more even expansion of the grip on the tube, leading to easier insertion of the spigot.

The grooves in the front members, the flare in the front members and the groove in the back members will usually be provided with a series of ridges, grooves, striations, hatching or other form of roughening, such as sandblasting, to aid friction and thus grip between the jaw members and the tube.

As shown in FIGS. 2 and 3, the jaw members 21, 22 are provided in their own pockets, 26, 27. In order to accommodate the flexible tube, the front, 28 and centre of the pockets 29 are also contoured. Alternatively, the two blocks, 31, 32, could be positioned adjacent each other in a single pocket 33, as shown in FIG. 4. While the blocks are separate, they are accommodated together, with no divider between them. They are individually compressible, each having their own compression spring, 34, 35. As before, the front 36 of the block 30 is contoured to accommodate the tube.

Much of the apparatus will be of a plastics material, and preferably any pistons and/or motors used, will be removable or fully sealed, such that the apparatus can be placed in an autoclave for sterilisation. The compressible jaw members 21, 22, 31, 32 may be made of plastics material or of metal. It has been found that the harder metal lasts longer before the movement of the tube within the jaw, particularly the front jaw member, caused by the insertion of the spigot, polishes the member, reducing its grip, which ultimately leads to it needing to be replaced.

The carriers 18 are held on a pair of runners 24, mounted on the base. The carriers are moved on the runners between an opened position in which the tube can be inserted or removed, and a closed position, in which the tube is held securely, but not crushed. Alternative systems for allowing and controlling the movement of the carrier can be used. For example sliders provided in grooves in the base, or the carriers can be provided with wheels. The carriers can be moved manually using a lever or the like, between two pre-set positions, typically under cam control. However, usually the movement of the carriers will be powered, generally with a pair of pneumatic pistons or a motor, with an operator activating a button, switch or the like to open or close the jaws.

The base also holds a microprocessor, not shown. This is programmable to control motors, to determine the stroke, timing and starting position of the spigot support, for movement of the jaws and spigot support, including forwards and backwards movement of the support, and opening and closing of the jaws. It will be programmed prior to use of the device, according to the combination of spigot and tube used.

Referring now to FIGS. 5-10, which show the insertion of a spigot having a barb, into a tube.

For connecting a flexible tube to a spigot, an operator will programme the microprocessor to carry out the correct number of cycles, moving the predetermined distances or for predetermined times, including the starting position of the spigot. Alternatively the forward motion can be programmed to stop on at level of pressure against forward movement. Usually a number of programmes will have been pre-programmed into the microprocessor and the operator will select the one for the combination of tube and spigot to be connected.

Figure 5:
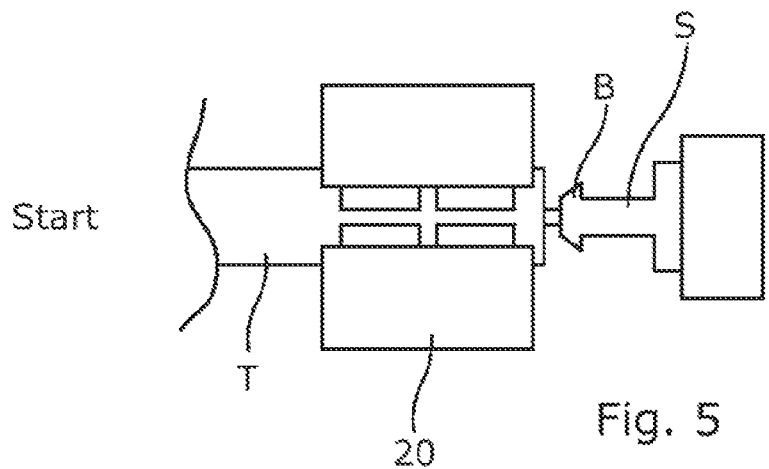
FIG. 5 is a top view at the start of the insertion cycle, according to the invention.

The operator will then attach the device incorporating the spigot to be connected onto a suitable attachment 12, with the end of the rod 13 extending slightly from the end of the hollow spigot. The attachment will then be connected to the support 4. The operator will then fit jaws 20 appropriate to the tube and spigot combination onto the carriers. He will then hold the tube between the jaws 20, with the end of the tube extending very slightly beyond the end of the jaws 20, and with the end of the tube T extending very slightly over the end of the rod 13, and close the jaws. Thus the opening of the tube T and the end of the barb B will be in line. This is as shown in FIG. 5.

The spigot S is then ready for insertion into the tube, and the operator activates the device. Under control of the microprocessor, the forward motion of the support 4 is then activated. The spigot S carried on the support 4 is moved forwards along the runners until it starts to enter the tube.

If the tube is a standard tube having good flexibility and the spigot does not have an extreme barb, then it may be possible to urge the spigot into the tube, to the full extent that is desirable, using a single forwards movement of the support. The stroke, namely distance it is necessary for the spigot to travel to be fully inserted into the tube, having been programmed onto the microprocessor in accordance with the particular spigot and tube, prior to the start of the insertion operation.

However, in cases, where the tube T is slightly stiff or thick, and/or the spigot has a larger barb B, or one that is more difficult to insert into a tube, the spigot may not pass into the tube to the extent that is desired, in a single forwards movement. The inside edge of the tube may "catch" on the barb profile, and start to curl inwards and/or the tube may start to "bunch" slightly, being compressed by the force of the advancing spigot, substantially halting forward movement of the support. As the jaws are holding the tube firmly, particularly the back section, which is not effected by any compressing of the front section in response to the advancing spigot, the tube is not pushed back to any significant extent, nevertheless the spigot can be substantially prevented from advancing.

Figure 6:
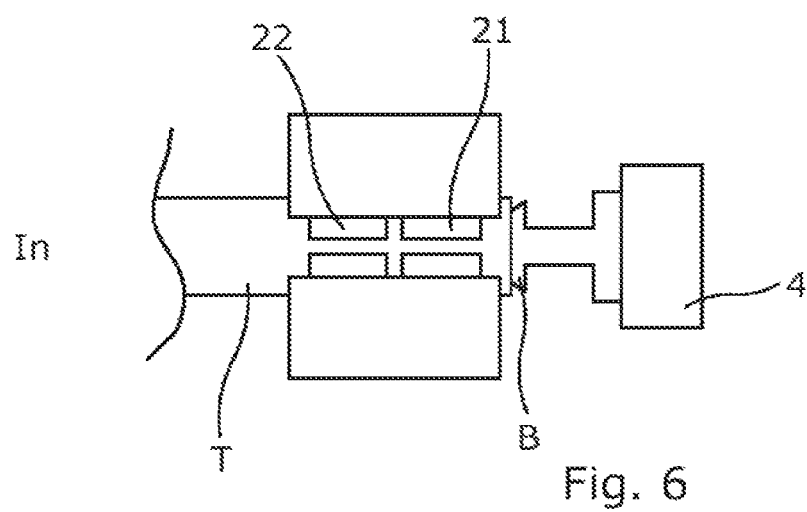
FIG. 6 is a top view of the insertion cycle, once the spigot has been partially inserted, at the end of the first cycle.

At this stage, the spigot will have been inserted partially into the tube, as shown in FIG. 6. To fully insert the spigot, this operation is repeated the number of times required. This will depend upon the tube T and barbed spigot S combination, but anything between two and six cycles is typical.

In the example shown in the Figures, at the end of the first cycle, the spigot extends partially into the tube. Under control of the microprocessor, the jaw carriers 18 are opened. This allows the tube on the spigot to relax slightly, and uncurl where it may have started to curl or bunch on the spigot.

At this stage is it possible to close the jaws, which form a strong grip on the tube and part of the spigot. The spigot will not extend into the back section and thus this section in particular will forming a tight grip on the tube. Thus support can then be advanced again, urging the spigot further into the tube. If the spigot is still not fully inserted into the tube, this cycle can be repeated again, with the jaws being opened to allow the tube to relax and then closed, before the spigot advancing once again.

While this cycle can be successful in inserting the spigot into the tube, it results in the tube being pushed further back into the jaws with the increasing number of cycles. This is because as the tube relaxes, it moves away from the spigot and further through the jaws. As a result when the jaws close again, the tube is further back in the jaw with the spigot also further back between the jaws. Over a small number of cycles this will be fairly insignificant, and thus in insertion of the spigot into the tube will be achieved. However, positioning of the tube and spigot further into the jaws is not advantageous.

Figure 7:
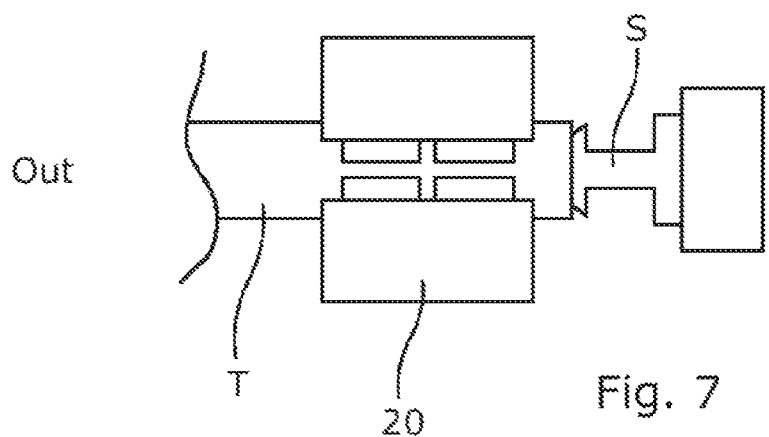
FIG. 7 is a top view of the insertion cycle, the spigot and tube having retreated for the start of a second cycle.

As a result the preferred cycle further includes the step of retreating the spigot S a short distance after opening of the jaws. As the tube is connected to the spigot, the tube will be drawn through the jaws as the spigot is retracted, while remaining attached to the spigot. At this stage the section of spigot which has already been inserted into the spigot is substantially level with the front of the jaws, with the section that has not been inserted is outside the jaws. The jaws are then closed, with the back section in particular, forming a firm grip on the tube. This is as shown in FIG. 7. The support 4 is then advanced again, urging the spigot further into the tube. Part of the tube now extends outside the jaws. The majority of this is the section into which the barb has already been pushed. However, the jaws support the majority of the section into which the tube is still to be inserted, and a section further back. This prevents the tube from being pushed back as the spigot advances, with the spigot being urged further into the tube.

Figure 8:
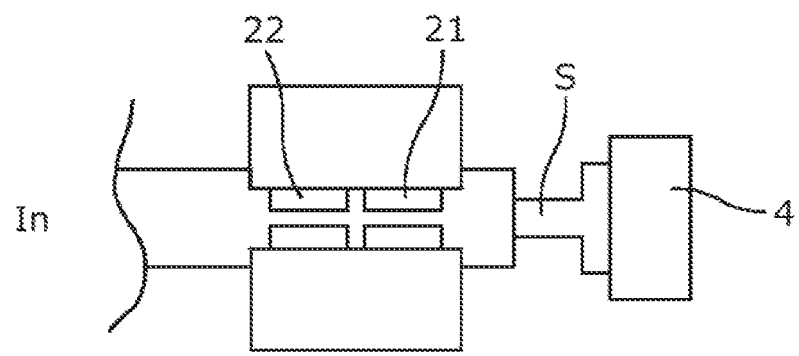
FIG. 8 a top view of the insertion cycle, the spigot having been further inserted following a second cycle.
Figure 9:
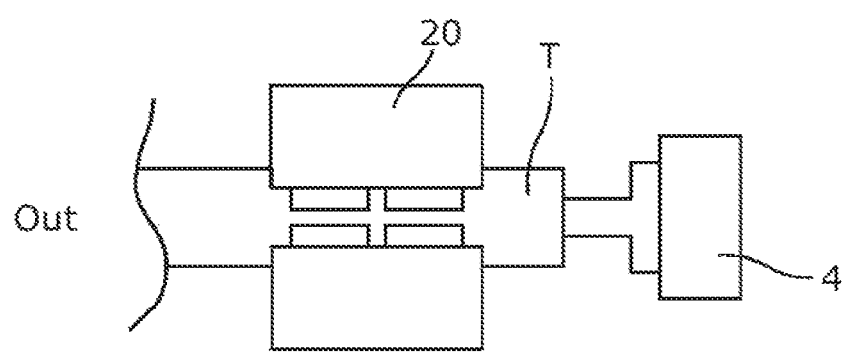
FIG. 9 a top view of the insertion cycle, the spigot and tube having retreated for the start of the third cycle.

As before, it may be that the tube again "catches" on the spigot, or "bunches" slightly, and prevents the spigot from fully inserting therein. However, the spigot will have penetrated further into the tube, as shown in FIG. 8. The cycle is repeated. The jaws are opened and the support retracted. The jaws are then closed again, as shown in FIG. 9. As before the tube has been pulled slightly further through the jaws with the retreating support and a section further back on the jaws is clamped therebetween. The support then advances, urging more of the spigot into the tube.

Figure 10:
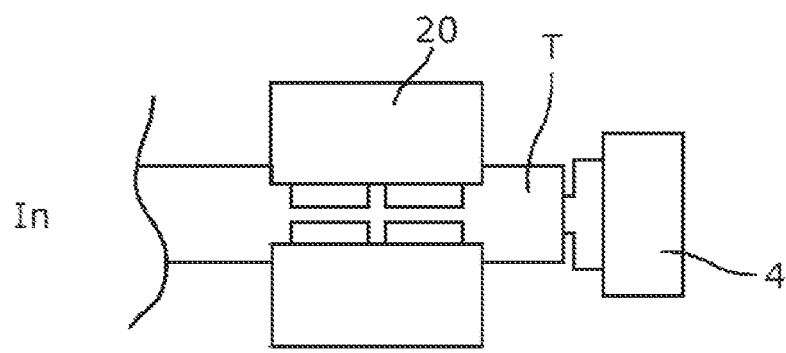
FIG. 10 is a top view of the insertion cycle, the spigot having been fully inserted into the tube on the third cycle.

As shown in FIG. 10, this time the spigot has been fully inserted into the tube. However, for other combinations of tube and spigot additional or fewer cycles may be required.

The final stage of the process is to open the jaws, whereby the spigot and tube combination can be removed from the support, for use.

The movement of the support 4 and the opening and closing of the jaws 20 are controlled by the microprocessor. The cycle of movement is programmed onto the microprocessor before operation, in accordance with the requirements for the flexible tube and spigot combination. A typical programme for the microprocessor, which controls the movement in accordance with the example shown in the Figures, includes the steps of:—

1) advancing the support forwards by a predetermined distance, then halting forward movement;
2) opening the jaws;
3) retreating the support a predetermined distance;
4) closing the jaws;
5) advancing the support by a predetermined distance, then halting forward movement;
6) opening the jaws;
7) retreating the support a predetermined distance;
8) closing the jaws are closed; and
9) advancing the support a final predetermined distance.

As discussed above, steps 3 and 7, namely retreating the support a predetermined distance, are not essential and may be omitted. On opening of the jaws, the tube can relax, making it again ready to accept the spigot when advanced. However, in order to prevent the tube and spigot combination being held further back in the jaws, it is advantageous to include this step.

The predetermined distances of the forwards and backwards motion of the spigot will depend upon the length of the spigot and the number of cycles required, and will be set in accordance with a particular tube and spigot combination. For some combinations, less forward advances will be required, as the spigot can be fully inserted after a single or double movement, however, for other combinations, more forward and back movements are required. Thus for some combinations greater advances can be made per cycle, with the predetermined distance for forwards movement being higher, while in other combinations, less forwards movement can be achieved. In each case the retreating or backwards movement of the support will be a very short distance only, to allow the tube to relax around the spigot.

Alternatively, the microprocessor can be programmed to operate on a time control system, with the forwards movement being for a small number or fractions of seconds, followed by opening of the jaws, retreating either for a period of time, typically small fractions of seconds, or a set distance, and then repeating this cycle a set number of times.

In a further alternative, the microprocessor can be programmed to react to resistance against movement, such that while the spigot is moving forwards into the tube, forwards movement continues. However, when or if the spigot catches or starts to bunch or compress the tube, leading to a substantial ceasing in the forward motion, the microprocessor causes the forwards motion to stop, the jaws to open, the support to move backwards a small distance or for a short time, and the jaws to close again. Forward movement of the support is then restarted. This cycle can be repeated until the support has moved forward by a predetermined distance, until no further forwards motion is detected over two or more cycles, or until an operator stops the cycle.

Usually the number of cycles will be pre-determined by being programmed into the microprocessor. However, if the microprocessor is programmed to react to a resistance, the number of cycles can be determined by the motion or the resistance as described above. Alternatively the number of cycles can be programmed to continue until stopped by an operator.

The invention is not intended to be restricted to the details of the above-described embodiment. For instance, the apparatus may be partially automated, or partially manual, or any combination thereof, with the initial and final opening and closing of the jaws being by lever action.

The invention claimed is:

1. A method of inserting a spigot into a flexible tube, using an apparatus comprising:—
    a support movably mounted on a base, the support configured to receive a spigot; and
    a tube grip mounted to the base, and configured to grip a flexible tube for insertion of the spigot;
    the grip comprising a pair of jaws for gripping and releasing the tube, with sufficient strength to hold to the tube but not crush the tube,
    at least part of one or both jaws being moveably mounted against a resistance such that under the force of the advancing spigot at least part of one or both jaws can release sufficiently to allow the spigot to pass into the tube, while retaining the tube in the apparatus;
    the method comprising the steps of:—
    advancing the support;
    halting advance of the support;
    opening the jaws;
    closing the jaws;
    repeating this cycle; and
    wherein the steps of advancing and halting advance of the support are carried out independently of the steps of opening the jaws and closing the jaws such that the support is movable independently of the jaws.

2. A method as claimed in claim 1, including the additional step of retracting the support between the steps of opening and closing the pair of jaws.

3. A method as claimed in claim 2, wherein the step of advancing the support comprises advancing the support by a predetermined distance.

4. A method as claimed in claim 2, wherein the step of advancing the support comprises advancing the support for a predetermined period of time.

5. A method as claimed in claim 2, wherein the step of advancing the support comprises advancing the support until a predetermined resistance it met.

6. A method as claimed in claim 1, wherein the step of repeating the cycle is repeated a predetermined number of times.

7. The method of claim 1 further comprising a microprocessor configured to control a movement of the support, and a movement of the at least part of one or both jaws.

8. The method of claim 7 wherein the step of halting advance of the support is carried out after the step of advancing;
    wherein the step of opening the jaws is performed after the step of halting; and
    wherein the step of closing the jaws is performed after the step of opening.

* * * * *